United States Patent
Shiga et al.

(10) Patent No.: US 8,690,714 B2
(45) Date of Patent: Apr. 8, 2014

(54) GOLF BALL MATERIAL AND GOLF BALL

(75) Inventors: Kazuyoshi Shiga, Kobe (JP); Toshiyuki Tarao, Kobe (JP); Keiji Ohama, Kobe (JP)

(73) Assignee: SRI Sports Limited, Kobe (JP)

( * ) Notice: Subject to any disclaimer, the term of this patent is extended or adjusted under 35 U.S.C. 154(b) by 608 days.

(21) Appl. No.: 12/977,129

(22) Filed: Dec. 23, 2010

(65) Prior Publication Data

US 2011/0159990 A1 Jun. 30, 2011

(30) Foreign Application Priority Data

Dec. 28, 2009 (JP) ................................ 2009-298111

(51) Int. Cl.
*A63B 37/04* (2006.01)
(52) U.S. Cl.
USPC .......................... 473/378; 473/371; 473/374
(58) Field of Classification Search
None
See application file for complete search history.

(56) References Cited

U.S. PATENT DOCUMENTS

| | | | |
|---|---|---|---|
| 6,645,090 B2 * | 11/2003 | Ohama et al. | 473/371 |
| 6,688,992 B2 * | 2/2004 | Takemura et al. | 473/378 |
| 6,794,447 B1 | 9/2004 | Kim et al. | |
| 6,949,610 B2 * | 9/2005 | Iwami | 473/378 |
| 7,101,292 B2 * | 9/2006 | Ohama et al. | 473/374 |
| 7,186,777 B2 * | 3/2007 | Wu et al. | 524/765 |
| 7,264,559 B2 | 9/2007 | Ohama et al. | |
| 7,294,069 B2 | 11/2007 | Isogawa et al. | |
| 7,326,749 B2 | 2/2008 | Fujisawa et al. | |
| 7,332,533 B2 | 2/2008 | Kim et al. | |
| 7,390,542 B2 | 6/2008 | Ohama et al. | |
| 2002/0010035 A1 * | 1/2002 | Nesbitt et al. | 473/371 |
| 2002/0019273 A1 * | 2/2002 | Ohama | 473/376 |
| 2002/0025862 A1 * | 2/2002 | Sullivan et al. | 473/374 |
| 2003/0139228 A1 * | 7/2003 | Cavallaro et al. | 473/364 |
| 2003/0199643 A1 * | 10/2003 | Iwami | 525/440 |
| 2004/0009831 A1 * | 1/2004 | Ohama et al. | 473/378 |
| 2004/0092336 A1 | 5/2004 | Kim et al. | |
| 2004/0198535 A1 * | 10/2004 | Cavallaro et al. | 473/371 |
| 2004/0220371 A1 * | 11/2004 | Wu | 528/76 |
| 2005/0059756 A1 | 3/2005 | Kim et al. | |
| 2006/0009308 A1 * | 1/2006 | Isogawa et al. | 473/371 |
| 2006/0009585 A1 | 1/2006 | Fujisawa et al. | |
| 2006/0046871 A1 | 3/2006 | Ohama et al. | |
| 2006/0046872 A1 | 3/2006 | Ohama et al. | |

(Continued)

FOREIGN PATENT DOCUMENTS

| | | |
|---|---|---|
| JP | 2004-504900 A | 2/2004 |
| JP | 2006-43447 A | 2/2006 |

(Continued)

OTHER PUBLICATIONS

English translation only for Office Action in Japanese Application No. 2009-298111, dated Dec. 27, 2011.

*Primary Examiner* — Gene Kim
*Assistant Examiner* — John E Simms, Jr.
(74) *Attorney, Agent, or Firm* — Birch, Stewart, Kolasch & Birch, LLP (57) ABSTRACT

An object of the present invention is to provide a golf ball material producing a high spin rate on approach shots and a low spin rate on driver shots and a golf ball using the same. The present invention provides a golf ball material having a ratio [Shore D/log(bending stiffness)] of Shore D hardness to a logarithm of bending stiffness (kgf/cm²) of 19.0 or more.

17 Claims, 3 Drawing Sheets

(56) References Cited

U.S. PATENT DOCUMENTS

| | | |
|---|---|---|
| 2006/0128505 A1* | 6/2006 | Sullivan et al. ............... 473/371 |
| 2007/0117923 A1* | 5/2007 | Wu et al. ...................... 524/612 |
| 2008/0153629 A1* | 6/2008 | Sullivan ........................ 473/377 |
| 2008/0214326 A1 | 9/2008 | Kim et al. |
| 2008/0220902 A1* | 9/2008 | Sullivan et al. ............... 473/376 |
| 2008/0220903 A1* | 9/2008 | Sullivan et al. ............... 473/376 |
| 2009/0011857 A1* | 1/2009 | Bulpett et al. ................ 473/373 |
| 2009/0082137 A1* | 3/2009 | Okabe .......................... 473/385 |
| 2009/0124420 A1* | 5/2009 | Kamino et al. ............... 473/374 |
| 2009/0197706 A1* | 8/2009 | Yamada et al. ............... 473/378 |
| 2009/0264222 A1* | 10/2009 | Tarao ............................ 473/378 |
| 2010/0160087 A1* | 6/2010 | Nakamura et al. ........... 473/375 |

FOREIGN PATENT DOCUMENTS

| | | |
|---|---|---|
| JP | 2006-43448 A | 2/2006 |
| JP | 2006-95286 A | 4/2006 |
| JP | 2006-95287 A | 4/2006 |

\* cited by examiner

Fig. 3

GOLF BALL MATERIAL AND GOLF BALL

FIELD OF THE INVENTION

The present invention relates to a golf ball material that produces a high spin rate on approach shots and a low spin rate on driver shots, and a golf ball using the same.

DESCRIPTION OF THE RELATED ART

Ionomer resins and polyurethanes are used as a resin component for forming a golf ball cover. Ionomer resins have high rigidity, and if ionomer resins are used as a constituting member of a golf ball, a golf ball traveling a great distance is obtained. Therefore, ionomer resins are widely used as a material of an intermediate layer or a cover constituting a golf ball. Polyurethanes are flexible, and if polyurethanes are used as a cover material of a golf ball, a golf ball having excellent spin performance and shot feeling is obtained.

There are proposals to improve the performance of a golf ball by blending fillers, such as organic short fibers, metal, and clay minerals, into a constituting member of the golf ball. For example, Japanese Patent Publication Nos. 2006-043447 A and 2006-043448 A disclose a golf ball which has a core and an outer layer portion surrounding the core, and the outer layer portion is formed from a resin composition which contains a cation treated layered silicate in a resin matrix. Japanese Patent Publication Nos. 2006-095286 A and 2006-095287 A disclose a golf ball which has a core, an intermediate layer covering the core, and a cover layer covering the intermediate layer, wherein the intermediate layer is formed from a resin composition which contains a cation treated layered silicate. Japanese Publication No. 2004-504900 T discloses a golf ball containing a nanocomposite material that is made of a polymer having a structure in which particles of inorganic materials are reacted and substantially evenly dispersed, in which each particle has a largest dimension that is about one micrometer or less and that is at least an order of magnitude greater than such particle's smallest dimension.

SUMMARY OF THE INVENTION

It is an ultimate goal for those who develop golf balls to provide a golf ball traveling a great distance on driver shots, and stopping quickly on the green on approach shots. The golf ball should have a low spin rate on driver shots in order to travel a great distance and should have a high spin rate on approach shots in order to stop quickly on the green. In the conventional improvements of golf balls, an attempt to increase the spin rate on approach shots also increases the spin rate on driver shots. Therefore, it has been difficult to strike a balance between traveling a long distance on driver shots and stopping quickly on the green on approach shots. The present invention has been achieved in view of the above circumstances. An object of the present invention is to provide a golf ball material producing a high spin rate on approach shots and a low spin rate on driver shots and a golf ball using the same.

The inventors of the present invention have addressed the above described problem, and achieved the present invention based on the findings that a golf ball material having a ratio [Shore D/log(bending stiffness)] of Shore D hardness to a logarithm of bending stiffness (kgf/cm$^2$) of 19.0 or more produces a high spin rate on approach shots and a low spin rate on driver shots. It is considered that the compressive deformation is dominant on driver shots and the shear deformation is dominant on approach shots for the deformation of the cover. The material having high Shore D hardness is considered to show a behavior of a hard material against the compressive deformation like driver shots. Thus, if the material having high Shore D hardness is used, the golf ball producing a low spin rate on driver shots is obtained. On the other hand, the material having a low bending stiffness is considered to show a behavior of a soft material against the shear deformation like approach shots. Thus, if the material having a low bending stiffness is used, the golf ball producing a low spin rate on approach shots is obtained. The gist of the present invention resides in that the golf ball producing a low spin rate on driver shots while producing a high spin rate on approach shots is obtained by controlling a ratio [Shore D/log(bending stiffness)] of Shore D hardness to a logarithm of bending stiffness (kgf/cm$^2$).

According to the present invention, a golf ball having a high spin rate on an approach shot and a low spin rate on a driver shot, is obtained.

DESCRIPTION OF THE PREFERRED EMBODIMENT

The present invention provides a golf ball material having a ratio [Shore D/log(bending stiffness)] of Shore D hardness to a logarithm of bending stiffness (kgf/cm$^2$) of 19.0 or more. Controlling the above ratio [Shore D/log(bending stiffness)] makes it possible to provide a golf ball having a low spin rate on driver shots, irrespective of producing a high spin rate on approach shots. The ratio [Shore D/log(bending stiffness)] is preferably 20.1 or more, more preferably 21.0 or more.

The golf ball material of the present invention preferably has Shore D hardness of 15 or more, more preferably 20 or more, even more preferably 25 or more. If the golf ball material has Shore D hardness of 15 or more, the golf ball travelling a great distance is obtained, because the spin rate on driver shots becomes low. The golf ball material of the present invention has no limitation on the upper limit of Shore D hardness, but preferably has Shore D hardness of 60 or less, more preferably 50 or less, even more preferably 45 or less. Herein, the above hardness is a slab hardness by measuring the golf ball material that is formed into a sheet form. Sheets having a thickness of about 2 mm are prepared from the golf ball material by hot press molding and preserved at the temperature of 23° C. for two weeks. Three or more of the sheets are stacked to avoid being affected by the measuring substrate on which the sheets are placed, and the stack is subjected to the measurement using a hardness tester provided with the Shore D type spring hardness tester prescribed by ASTM-D2240.

The golf ball material of the present invention preferably has a bending stiffness (kgf/cm$^2$) of 300 kgf/cm$^2$ or less, more preferably 250 kgf/cm$^2$ or less, even more preferably 200 kgf/cm$^2$ or less. If the golf ball material of the present invention has a bending stiffness of 300 kgf/cm$^2$ or less, it is possible to provide a golf ball having a high spin rate on approach shots. The golf ball material of the present invention has no limitation on the lower limit of the bending stiffness, but preferably has a bending stiffness of 5 kgf/cm$^2$ or more, more preferably 8 kgf/cm$^2$ or more, even more preferably 10 kgf/cm$^2$ or more. If the golf ball material has a bending stiffness of 5 kgf/cm$^2$ or more, the durability of the cover is improved.

The golf ball material of the present invention preferably contains an ionomer resin or a thermoplastic elastomer as a resin component. Examples of the thermoplastic elastomer include a thermoplastic polyolefin elastomer, a thermoplastic polyester elastomer, a thermoplastic polyamide elastomer, a thermoplastic polyurethane elastomer, and a thermoplastic polystyrene elastomer.

Specific examples of the thermoplastic elastomers are a thermoplastic polyamide elastomer having a commercial name of "Pebax (registered trademark) (e.g. "Pebax 2533")" commercially available from Arkema K. K.; a thermoplastic polyurethane elastomer having a commercial name of "Elastollan (e.g. "Elastollan XNY97A")" commercially available from BASF Japan Ltd.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation.

In a preferable embodiment, the golf ball material of the present invention contains a thermoplastic polyurethane elastomer as a resin component. The content of the thermoplastic polyurethane elastomer in the resin component is preferably 50 mass % or more, more preferably 70 mass % or more, even more preferably 90 mass % or more. In a more preferable embodiment, the resin component essentially consists of the thermoplastic polyurethane elastomer. Use of the soft polyurethane as the resin component provides the golf ball with a high spin rate on approach shots.

The thermoplastic polyurethane elastomer is not limited, as long as it is a thermoplastic material having a plurality of urethane bonds in the molecule thereof, and includes, for example, a product having the urethane bonds in the molecule thereof, formed by a reaction between a polyisocyanate and a polyol. Further, the chain extending reaction with a chain extender such as a low molecular weight polyamine or low molecular weight polyol may be conducted where necessary.

The polyisocyanate component constituting the thermoplastic polyurethane elastomer is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate (H$_{12}$MDI), hydrogenated xylylenediisocyanate (H$_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the thermoplastic polyurethane elastomer. Use of the aromatic polyisocyanate improves the mechanical property of the obtained polyurethane and provides the cover with the excellent abrasion-resistance. In addition, in view of improving the weather resistance, as the polyisocyanate component of the thermoplastic polyurethane elastomer, a non-yellowing type polyisocyanate such as TMXDI, XDI, HDI, H$_6$XDI, IPDI, H$_{12}$MDI and NBDI is preferably used. More preferably, 4,4'-dicyclohexylmethane diisocyanate (H$_{12}$MDI) is used. Since 4,4'-dicyclohexylmethane diisocyanate (H$_{12}$MDI) has a rigid structure, the mechanical property of the resulting thermoplastic polyurethane elastomer is improved, and thus the cover which is excellent in abrasion-resistance can be obtained.

The polyol component constituting the thermoplastic polyurethane elastomer is not particularly limited as long as it has a plurality of hydroxyl groups, and such examples include a low-molecular weight polyol that is used for example as a chain extender and a polymer polyol that constitutes a soft segment. Examples of the low-molecular weight polyol include a diol such as ethylene glycol, diethylene glycol, triethylene glycol, propanediol, dipropylene glycol, 1,3-butanediol, 1,4-butanediol, neopentyl glycol, 1,6-hexanediol; a triol such as glycerin, trimethylol propane, and hexanetriol. Examples of the polymer polyol include a polyether polyol such as polyoxyethylene glycol (PEG), polyoxypropylene glycol (PPG), and polytetramethylene ether glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. As the polyol component constituting the thermoplastic polyurethane elastomer used in the present invention, polytetramethylene ether glycol is preferable.

A number average molecular weight of the polymer polyol is not particularly limited, and for example, the number average molecular weight is preferably 400 or more, more preferably 1,000 or more. If the number average molecular weight of the polymer polyol is too small, the resultant polyurethane becomes hard and the shot feeling of the golf ball deteriorates. The upper limit of the number average molecular weight of the polymer polyol is not particularly limited, and it is preferably 10,000, more preferably 8,000.

The polyamine component that constitutes the thermoplastic polyurethane elastomer where necessary may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine such as phenylenediamine, toluenediamine, diethyltoluenediamine, and dimethylthiotoluenediamine, xylylenediamine, and diphenylmethanediamine.

The thermoplastic polyurethane elastomer preferably has a slab hardness of 5 or more, more preferably 10 or more, and even more preferably 15 or more in Shore D hardness. If the thermoplastic polyurethane elastomer has a slab hardness of 5 or more in Shore D hardness, it is possible to keep the shape of the cover. The thermoplastic polyurethane elastomer preferably has a slab hardness of 50 or less, more preferably 45 or less, even more preferably 40 or less in Shore D hardness. If the thermoplastic polyurethane elastomer has a slab hardness of 50 or less in Shore D hardness, it is possible to maintain the material hardness low, even after the filler is blended.

The thermoplastic polyurethane elastomer has no limitation on the constitutional embodiments thereof. Examples of the constitutional embodiments are the embodiment where the polyurethane elastomer consists of the polyisocyanate component and the polymer polyol component; the embodiment where the polyurethane elastomer consists of the polyisocyanate component, the polymer polyol component and the low-molecular weight polyol component; and the embodiment where the polyurethane elastomer consists of the polyisocyanate component, the polymer polyol component, the low-molecular weight polyol component, and the polyamine component; and the embodiment where the polyurethane elastomer consists of the polyisocyanate component, the polymer polyol component and the polyamine component. Examples of the polyurethane include "Elastollan XNY90A", "Elastollan XNY97A", "Elastollan 585" commercially available from BASF Japan Ltd.

The golf ball material of the present invention may contain an ionomer resin as a resin component.

Specific examples of the ionomer resins include trade name "Himilan (registered trademark)" (e.g. the binary copolymerized ionomer such as Himilan 1555 (Na), Himilan 1557 (Zn), Himilan 1605 (Na), Himilan 1706 (Zn), Himilan 1707 (Na), Himilan AM7311 (Mg), Himilan AM7329 (Zn); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 6320 (Mg), Surlyn 8120 (Na), Surlyn 8320 (Na), Surlyn 9320 (Zn))" and the ternary copolymerized ionomer such as "HPF 1000 (Mg), HPF 2000 (Mg)" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation. The ionomer resins can be used solely or as a mixture of at least two of them. It is noted that Na, Zn, Li, and Mg described in the parentheses after the trade names indicate metal types of neutralizing metal ions for the ionomer resins.

The golf ball material of the present invention preferably contains a filler. The filler used in the present invention includes, for example, a flake-like filler, needle-like filler or fibrous filler. The fillers having different shapes may be used in combination. The golf ball material of the present invention more preferably contains the flake-like filler or the needle-like filler.

The flake-like filler includes, for example, a glass flake, a calcium carbonate flake, an aluminum flake, a layered silicate, or an organically modified layered silicate. In the present invention, the layered silicate or organically modified layered silicate is preferably used as the flake-like filler.

The layered silicate is a silicate having a layered structure. The organically modified layered silicate is a layered silicate, in which a part or all of the metallic cations that are intrinsically contained within a layered silicate crystal interlayer are exchanged with organic cations. In the present invention, a layered silicate that is not organically modified is simply referred to as a "layered silicate", and a layered silicate that is organically modified is called an "organically modified layered silicate".

The layered silicate is not limited, as long as it is a silicate that has a layered structure. Examples are: layered silicates of kaolinites such as kaolinite, dickite, halloysite, chrysotile, lizardite, and amesite; layered silicates of smectites such as montmorillonite, beidellite, nontronite, saponite, ferrous saponite, hectorite, sauconite, and stevensite; layered silicates of vermiculites such as dioctahedral vermiculite, and trioctahedral vermiculite; layered silicates of micas such as muscovite, paragonite, phlogopite, biotite, and lepidolite; layered silicates of brittle micas such as margarite, clintonite, and anandite; layered silicates of chlorites such as cookeite, sudoite, clinochlore, chamosite, and nimite. These layered silicates may be natural or synthetic in origin, and may be used solely or as a mixture of two or more types. Among these, layered silicates of smectites such as montmorillonite, beidellite, nontronite, saponite, ferrous saponite, hectorite, sauconite, and stevensite; and layered silicates of vermiculites such as dioctahedral vermiculite, and trioctahedral vermiculite; are preferred as a layered silicate to be used in the present invention. Among these, montmorillonite is especially preferred.

Each layer (primary particle) that constitutes the layered silicate is preferably a nano size fine particle with a thickness of 10 nm or less, and preferably has a flat shape with a length of 1 μm or less, and a width of 1 μm or less. There is no limitation on the size of the layered silicate, however, the size is preferably 1 μm or less, more preferably 700 nm or less, and even more preferably 500 nm or less.

A cation exchange capacity of the layered silicate is preferably 30 meq/100 g or more, more preferably 40 meq/100 g or more, and even more preferably 50 meq/100 g or more, and is preferably 200 meq/100 g or less, more preferably 180 meq/100 g or less, and even more preferably 160 meq/100 g or less. If the cation exchange capacity is 30 meq/100 g or more, a sufficient exchange of an organic cation is achieved during organic modification, and the interlayer distance may be widened to a desired width. If the cation exchange capacity is 200 meq/100 g or less, bonding force in the crystal interlayer is not excessively strong, and the interlayer distance may be easily widened. The cation exchange capacity is an amount of exchangeable cation contained in a layered silicate per unit mass of the layered silicate.

An organic cation used during organic modification of the layered silicate is a cation that has a carbon chain. The organic cation is not limited, and examples include an organic ammonium ion, an organic phosphonium ion, and an organic sulfonium ion.

The carbon number of the carbon chain included in the organic cation is preferably 3 or more, more preferably 4 or more, and even more preferably 5 or more, and is preferably 50 or less, more preferably 40 or less, and even more preferably 30 or less. If the carbon number of the carbon chain included in the organic cation is in a range from 3 to 50, the interlayer distance of the layered silicate may be widened to a desired width during organic modification. The interlayer distance of the organically modified layered silicate is basically dependent on the length of the carbon chain included in the organic cation, and therefore, the carbon number of the carbon chain included in the organic cation may be altered as appropriate, depending on the desired interlayer distance.

Examples of the organic ammonium ion include: primary ammonium ions, such as stearyl ammonium ion, hexyl ammonium ion, octyl ammonium ion, and 2-ethyl hexyl ammonium ion; secondary ammonium ions such as dodecyl (lauryl) ammonium ion, and octadecyl (stearyl) ammonium ion; tertiary ammonium ions such as trioctyl ammonium ion; and quaternary ammonium ions such as dioctyl dimethyl ammonium ion, and distearyl dimethyl ammonium ion. Examples of the organic phosphonium ion include stearyl phosphonium ion and the like. Examples of the organic sulfonium ion include stearyl sulfonium ion and the like. These organic cations may be used solely, or in combination of two or more types.

A salt of the organic cation may be used as a source of the organic cation. For example, when stearyl ammonium is used as the organic cation, for example, stearylamine hydrochloride may be used as a source, and when distearyl dimethyl ammonium is used as the organic cation, for example, distearyl dimethyl ammonium chloride may be used as a source. The method for organic modification is described later.

An ion exchange rate of the organically modified layered silicate is preferably 50 mol % or higher, and more preferably 60 mol % or higher, and even more preferably 70 mol % or higher. If the ion exchange rate of the organically modified layered silicate is 50 mol % or higher, the dispersibility of the organically modified layered silicate in the resin component is improved. Herein, an ion exchange rate of the organically modified layered silicate is, a ratio (mole percentage) of an amount of cations that are exchanged with an organic cation, to the total amount of exchangeable cations contained within a layered silicate before organic modification.

Specific examples of the organically modified layered silicate include "Dellite (registered trade mark) 43B (purified montmorillonite, particle size: 500 nm, thickness: 1 nm, quaternary ammonium salt treatment: quaternary ammonium salt with benzyl group, tallowate group, two methyl groups)", "Dellite (registered trade name) 67G (purified montmorillonite, particle size: 500 nm, thickness: 1 nm, quaternary ammonium salt treatment: quaternary ammonium salt with two tallowate groups, two methyl groups), available from Laviosa Chimica Mineraria S.p.A. and "S-BEN" available from HOJUN Co., Ltd.

Examples of the needle-like filler for use in the present invention are inorganic whiskers such as a potassium titanate whisker, a graphite whisker, an alumina whisker, a silicon carbide whisker, a silicon nitride whisker, a mullite whisker, a magnesia whisker, a magnesium borate whisker, a zinc oxide whisker, and a titanium boride whisker. These needle-like fillers may be used alone or two or more of them may be used in combination.

Examples of the fibrous filler for use in the present invention are natural fibers of kenaf, cotton, flax plant, sheep wool, silk, feather, or asbestos; synthetic fibers such as a nylon fiber, a vinylon fiber, an acrylic fiber, a polyester fiber, a polyolefin fiber, and a polyurethane fiber; inorganic fibers such as a glass fiber, a carbon fiber, an alumina fiber, a potassium titanate fiber, a basic magnesium sulfate fiber, and a calcium carbonate fiber; natural mineral fibers such as wallastonite (CaO—$SiO_2$) and fibrous brucite ($Mg(OH)_2$); and a metal fiber. These fibrous fillers may be used alone or in combination of at least two of them. Further, the needle-like fillers and the fibrous fillers may be used in combination.

The average length of the needle-like and fibrous filler is preferably 1 µm or longer, more preferably 2 µm or longer, and even more preferably 5 µm or longer. The average length of the needle-like and fibrous filler is preferably 2,000 µm or shorter, and more preferably 1,500 µm or shorter. If the average length of the needle-like and fibrous filler is shorter than 1 µm, the durability of the golf ball may not be improved and if the average length exceeds 2,000 µm, the appearance of the golf ball may become poor.

Further, the average aspect ratio of the needle-like and fibrous filler is preferably 10 or higher, and more preferably 15 or higher. The average aspect ratio is preferably 100 or lower, and more preferably 50 or lower. If the average aspect ratio of the needle-like and fibrous filler is less than 10, the durability of the golf ball may not be improved and if the average aspect ratio exceeds 100, the appearance of the golf ball may become poor.

The average length of the needle-like and fibrous filler in the present invention means an average value of the length in the longitudinal direction of the needle-like or fibrous filler and the average aspect ratio means the ratio of the average length to the average diameter of the needle-like or fibrous filler (average length/average diameter).

In a preferable embodiment, the golf ball material of the present invention contains a resin component and a filler. The content of the filler is preferably 10 parts or more, more preferably 15 parts or more, even more preferably 20 parts or more, even more preferably 30 parts or more, and is preferably 100 parts or less, more preferably 80 parts or less, even more preferably 60 parts or less, even more preferably 50 parts or less with respect to 100 parts of the resin component by mass. If the content is 10 parts by mass or more, since it is possible to impart the orientation to the constituting member formed from the golf ball material, the spin rate on driver shots become low. If the content is 100 parts by mass or less, it is possible to keep the abrasion resistance at a high level.

The golf ball material of the present invention may further contain a pigment component such as a white pigment (for example, titanium oxide) and a blue pigment, a gravity adjusting agent such as calcium carbonate and barium sulfate, a dispersant, an antioxidant, an ultraviolet absorber, a light stabilizer, a fluorescent material or a fluorescent brightener.

The content of the white pigment (for example, titanium oxide) is preferably 0.5 part by mass or more, more preferably 1 part by mass or more, and is preferably 10 parts by mass or less, more preferably 8 parts by mass or less based on 100 parts by mass of the resin component. The white pigment in an amount of 0.5 part by mass or more can impart opacity to the constituting member formed from the golf ball material, while the white pigment in an amount of more than 10 parts by mass may lower the durability of the constituting member formed from the golf ball material.

The golf ball of the present invention is not limited, as long as it comprises a constituent member formed from the golf ball material of the present invention. For example, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least two intermediate layer disposed around the center, and a cover disposed around the core, anyone of constituent members may be formed from the above golf ball material. Among them, it is preferable that the cover is formed from the above golf ball material in the golf ball comprising a core and a cover.

A method for molding a golf ball cover from the golf ball material of the present invention containing a resin component and a filler will be explained. In the case of molding a golf ball cover from the golf ball material of the present invention containing a resin component and a filler, the filler in the cover is preferably oriented roughly parallel to the surface of the cover. If the filler is oriented roughly parallel to the surface of the cover, the cover shows anisotropic behavior. That is, the cover is considered to show behavior like a hard material against the deformation in the compression direction on driver shots and behavior like a soft material against the deformation in the shear direction on approach shots. In the case of using the flake-like filler, it is preferable that the face of the flake-like filler is oriented roughly parallel to the surface of the cover. In the case of using the needle-like filler or fibrous filler, it is preferable that the long direction of the needle-like filler or fibrous filler is oriented roughly parallel to the surface of the cover.

In the followings, the present invention will be explained, referring the golf ball material of the present invention to as the cover composition. The method for molding a cover comprises compression molding a cover composition containing a resin component and a filler to mold a shell, and compression molding a core covered with a plurality of shells to mold a cover. In a preferable embodiment, the method comprises compression molding a cover composition containing a resin component and a filler to mold a half shell, and compression molding a core covered with two half shells to mold a cover.

The cover composition may further contain a pigment component such as a white pigment (for example, titanium oxide) and a blue pigment, a gravity adjusting agent such as calcium carbonate and barium sulfate, a dispersant, an antioxidant, an ultraviolet absorber, a light stabilizer, a fluorescent material or a fluorescent brightener where necessary, in addition to the resin component described above and the filler.

Figure 1:
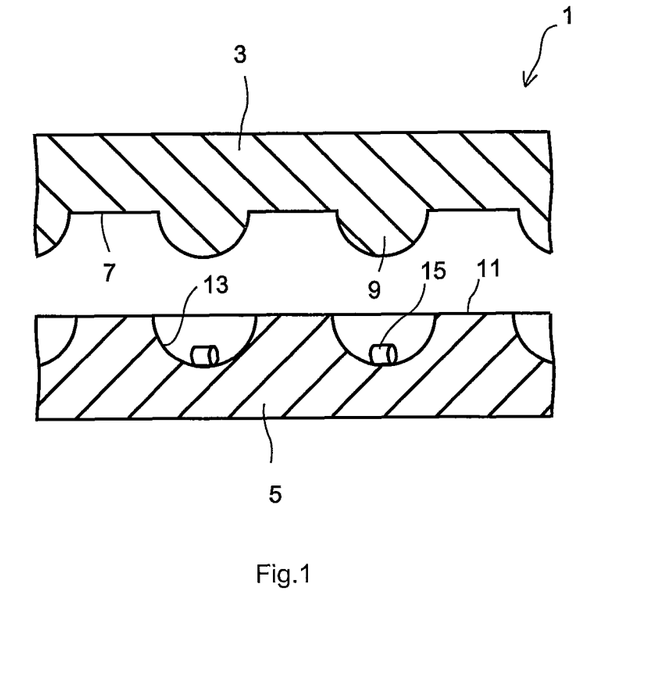
FIG. 1 is an explanatory illustration showing a method for molding a half shell.

In a method for molding a cover, half shells are preferably formed by compression molding. For example, FIG. 1 is an explanatory illustration showing a method of molding a half shell by compression molding. A mold 1 for forming half shells includes an upper mold 3 and a lower mold 5. The upper mold 3 is provided with a flat part 7 and hemispherical projections 9, and the lower mold 5 is provided with a flat part 11 and hemispherical recesses 13. Compression molding of half shells can be conducted by charging a cover material 15 in the pellet form into each recess 13 of the lower mold 5, and clamping the upper mold 3 and the lower mold 5 using a pressing machine or the like. In this case, two or more pellets may be charged into each recess 13 of the lower mold 5. When two or more pellets are charged, a seam (weld line) occurs between the pellets in an obtained half shell. Since a weld line has a possibility of reducing the durability of the obtained cover, the number of the pellets charged into each recess 13 of the lower mold 5 is preferably one. In this respect, the mass per pellet is preferably 1.4 g or more and 2.0 g or less. When the mass per pellet falls within the range from 1.4 g to 2.0 g, one half shell can be formed from one pellet. Further, if the number of pellets charged into one recess is one, the operation for charging pellets becomes easy.

The compression molding of the cover composition into half shell is preferably carried out under a pressure of 1 MPa or more, more preferably 2 MPa or more, and is preferably carried out under a pressure of 20 MPa or less, more preferably 15 MPa or less. If the molding pressure falls within the range from 1 MPa to 20 MPa, a half shell having a uniform thickness can be formed.

The compression molding of the cover composition into half shell is preferably carried out at a temperature of −20° C. or more, more preferably −10° C. or more, and is preferably carried out at a temperature of 70° C. or less, more preferably 60° C. or less, even more preferably 50° C. or less relative to the flow beginning temperature of the cover composition. If the molding temperature is 70° C. or less relative to the flow beginning temperature of the cover composition, the durability and the abrasion resistance of the cover improve. If the molding temperature is −20° C. or more relative to the flow beginning temperature of the cover composition, the moldability improves.

The molding temperature means the highest temperature where the temperature at the surface of the concave portion of the lower mold reaches from closing through opening the molds. Further, the flow beginning temperature of the cover material can be measured in a pellet form under the following conditions by using a flow characteristics evaluation apparatus (Flow Tester CFT-500, manufactured by Shimadzu Corporation).

Measuring conditions: Area size of a plunger: 1 cm$^2$, Die length: 1 mm, Die diameter: 1 mm, Load: 588.399 N, Start temperature: 30° C., and Temperature increase rate: 3° C./min.

The compression molding of the cover composition into half shell is preferably carried out for 30 minutes or less, more preferably 20 minutes or less, even more preferably 10 minutes or less, even more preferably 5 minutes or less. If the molding time is too long, the thermal decomposition of the polyurethane proceeds, which may result in the lower durability and abrasion resistance of the obtained cover. The molding time is preferably 1 minute or more, more preferably 2 minutes or more. For the molding time about 1 minute, the cover material in the form of the pellet flows in the mold, and the half shell can be molded. The molding time means a time from closing to opening the molds.

Figure 2:
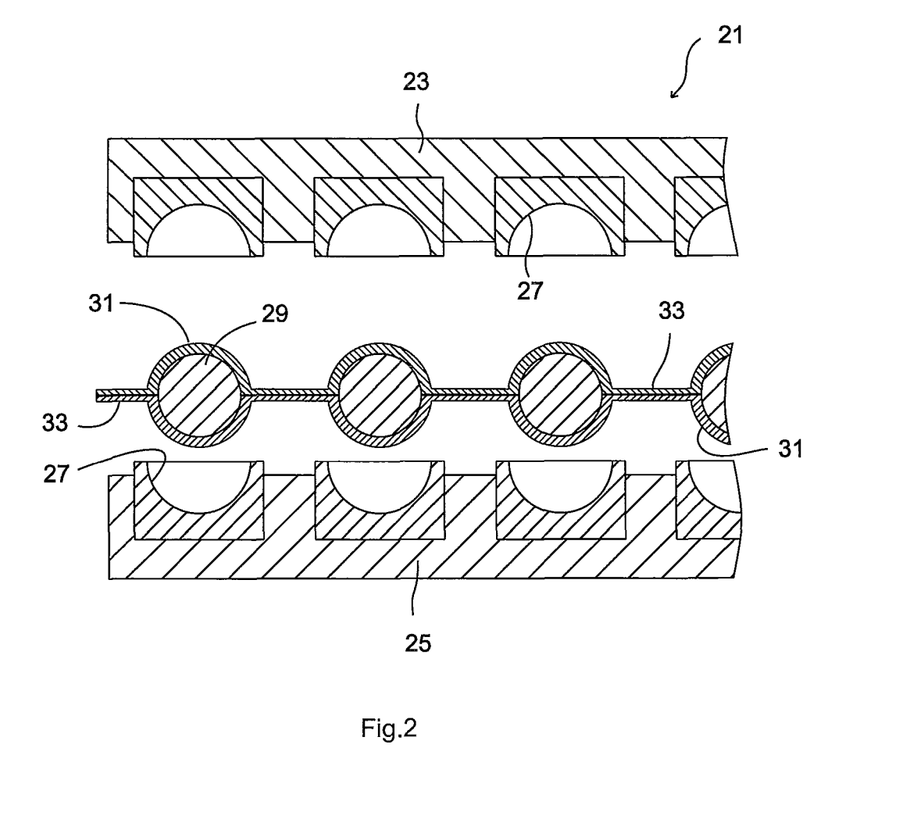
FIG. 2 is an explanatory illustration showing a method for molding a cover from half shells.

Examples of a method of forming a cover using the half shells produced as described above, include a method of compression molding a core covered with two half shells. FIG. 2 is an explanatory illustration showing a method of compression molding a core covered with two half shells. A mold 21 for forming covers (for compression molding) includes an upper mold 23 and a lower mold 25. Each of the upper mold 23 and the lower mold 25 has many cavity surfaces 27, thereby forming hemispherical cavities. After each core 29 is covered with two half shells 31, the obtained covered body is placed into the cavity of the lower mold 25, and the mold 21 is clamped using a pressing machine or the like, to form a cover. In the example shown in FIG. 2, half shells 31 are connected by a flat part 33 formed from the cover material. Although not shown in the drawing, many pimples are formed on each cavity surface, and dimples having a shape which is the inverted shape of the pimples are formed on the surface of the cover.

The compression molding of the half shells into the cover is preferably carried out at a temperature of −20° C. or more, more preferably −10° C. or more, and is preferably carried out at a temperature of 70° C. or less, more preferably 60° C. or less, even more preferably 50° C. or less relative to the flow beginning temperature of the cover composition. If the molding temperature is 70° C. or less relative to the flow beginning temperature of the cover composition, the durability and the abrasion resistance of the cover improve. If the molding temperature is −20° C. or more relative to the flow beginning temperature of the cover composition, the moldability improves.

The compression molding of the half shells into the cover is preferably carried out under a pressure of 0.5 MPa or more, more preferably 1 MPa or more, and is preferably carried out under a pressure of 25 MPa or less, more preferably 15 MPa or less. If the molding pressure falls within the range from 0.5 MPa to 25 MPa, a golf ball cover having a uniform thickness can be formed.

The compression molding of the half shells into the cover is preferably carried out for 30 minutes or less, more preferably 20 minutes or less, even more preferably 10 minutes or less, even more preferably 5 minutes or less. If the molding time is too long, the thermal decomposition of the polyurethane proceeds, which may result in the lower durability and abrasion resistance of the obtained cover. The molding time is preferably 1 minute or more, more preferably 2 minutes or more. For the molding time about 1 to 2 minutes, it is possible to mold the cover from half shells. The molding time means a time from closing to opening the molds.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed.

When molding a cover, the concave portions called "dimple" are usually formed on the surface. After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

In the present invention, the thickness of the cover of the golf ball is preferably 2.0 mm or less, more preferably 1.5 mm or less, even more preferably 1.0 mm or less. If the thickness of the cover is 2.0 mm or less, since it is possible to increase the diameter of the core, the resilience of the obtained golf ball is improved. The lower limit of the thickness of the cover is preferably, but not limited to, 0.3 mm, more preferably 0.4 mm, and even more preferably 0.5 mm. If the thickness of the cover is less than 0.3 mm, it may become difficult to mold the cover.

Next, a preferred embodiment of the core of the golf ball of the present invention will be explained. The core of the golf ball of the present invention includes, for example, a single-layered core, a core consisting of a center and a single-layered intermediate layer covering the center; and a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed as a part of the center in an integrated manner on the surface of the center, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core or the center of the golf ball of the present invention, is preferably obtained by, for example, heat-pressing a rubber composition (hereinafter, sometimes simply referred to as "core rubber composition") containing a base rubber, a crosslinking initiator, a co-crosslinking agent, and where necessary a filler.

As the base rubber, a natural rubber or a synthetic rubber can be used. Such examples include a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of the co-crosslinking agent needs to be increased in order to obtain an appropriate hardness, which may cause the insufficient resilience.

The co-crosslinking agent is not particularly limited, as long as it has the effect of crosslinking a rubber molecule by graft polymerization to a base rubber molecular chain. For example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and is preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide; a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl)disulfide are preferably used, since a golf ball having particularly high resilience can be obtained. The amount of the organic sulfur compound to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the core rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

In the case that the core consists of a center and a single-layered intermediate layer covering the center and that the core consists of a center and multi-piece or multi-layer of intermediate layers covering the center, the center can be formed from the core rubber composition described above. The diameter of the center is preferably 30 mm or more, more preferably 32 mm or more, and is preferably 41 mm or less, more preferably 40.5 mm or less. If the diameter of the center is less than 30 mm, the intermediate layer or the cover layer must be made thicker than the desired thickness, resulting in the lowered resilience. On the other hand, if the diameter of the center is more than 41 mm, the intermediate layer or the cover must be made thinner than the desired thickness, and hence the intermediate layer or the cover does not function well.

Examples of the material for the intermediate layer are a cured product of the rubber composition; an ionomer resin; a thermoplastic polyamide elastomer having a commercial name of "Pebax (registered trademark) (e.g. Pebax 2533)" available from Arkema; a thermoplastic polyester elastomer having a commercial name of "Hytrel (registered trademark) (e.g. Hytrel 3548, Hytrel 4047)" available from Du Pont-Toray Co., Ltd.; a thermoplastic polyurethane elastomer having a commercial name of "Elastollan (registered trademark) (e.g. Elastollan XNY97A)" available from BASF Japan Co., a thermoplastic polystyrene elastomer having a commercial name of "Rabalon (registered trademark) (e.g. Rabalon SR04, Rabalon T3339C, Rabalon T3221C)" available from Mitsubishi Chemical Corporation. As the ionomer resin, the ionomer resins exemplified as the material for the cover can be also used. The intermediate layer may further contain a specific gravity adjusting agent such as barium sulfate or tungsten or the like; an antioxidant; or a pigment component.

A method for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow-shells to the compression-molding.

In the case of using the intermediate layer composition containing a rubber composition as a main component (50 mass % or more), the intermediate layer preferably has a thickness of 1.2 mm or more, more preferably 1.8 mm or more, even more preferably 2.4 mm or more, and preferably has a thickness of 6.0 mm or less, more preferably 5.2 mm or less, even more preferably 4.4 mm or less.

In the case of using the intermediate layer composition containing the resin composition as a main component (50 mass % or more), the intermediate layer preferably has a thickness of 0.3 mm or more, more preferably 0.4 mm or more, even more preferably 0.5 mm or more, and preferably has a thickness of 2.5 mm or less, more preferably 2.4 mm or less, even more preferably 2.3 mm or less. If the thickness of the intermediate layer is more than 2.5 mm, the resilience performance of the obtained golf ball may be lowered, while if the thickness of the intermediate layer is less than 0.3 mm, it may be difficult to suppress the excessive spin rate on driver shots.

The intermediate layer of the golf ball of the present invention preferably has a slab hardness of 40 or larger, more preferably 45 or larger, and even more preferably 50 or larger, and preferably has a slab hardness of 80 or smaller, more preferably 70 or smaller, and even more preferably 65 or smaller in Shore D hardness. The intermediate layer having the slab hardness of 40 or more in shore D hardness makes the core have the higher degree of "hard outer and soft inner" structure, thereby providing a high launch angle and a low spin rate and hence achieving a great flight distance of the gold ball. On the other hand, the intermediate layer having the slab hardness of 80 or less in shore D hardness provides an excellent shot feeling as well as improves the spin performance of the golf ball, thereby improving controllability of the golf ball. Herein, the slab hardness of the intermediate layer is the measured hardness of the intermediate layer composition molded in the form of a sheet, and is measured by a later-described measuring method. The slab hardness of the intermediate layer can be adjusted, for example, by appropriately selecting a combination of the above resin components or the rubber materials and the amount of additives.

The core used in the golf ball of the present invention preferably has a diameter of 39 mm or larger, more preferably 39.5 mm or larger, and even more preferably 40.8 mm or larger, and preferably has a diameter of 42.2 mm or smaller, more preferably 42 mm or smaller, and even more preferably 41.8 mm or smaller. If the diameter of the core is smaller than the above lower limit, the cover becomes so thick that the resulting golf ball would have reduced resilience. On the other hand, if the diameter of the core is larger than the above upper limit, the cover becomes so thin that it is difficult to mold a cover.

In a preferable embodiment, the core has a hardness difference between the center and the surface. The difference between the surface hardness and the center hardness is preferably 10 or more, more preferably 12 or more, and is preferably 40 or less, more preferably 35 or less, and even more preferably 30 or less in JIS-C hardness. If the hardness difference is more than 40, the durability may be lowered, while if the hardness difference is less than 10, the shot feeling may be hard because of a large impact. The surface hardness of the core is preferably 65 or more, more preferably 70 or more, even more preferably 72 or more, and is preferably 100 or less in JIS-C hardness. If the surface hardness of the core is less than 65 in JIS-C hardness, the core is so soft and the repulsion property may be lowered, resulting in the short flight distance. On the other hand, if the surface hardness of the core is more than 100, the core is so hard and the shot feeling may deteriorate. The center hardness of the core is preferably 45 or more, more preferably 50 or more, and is preferably 70 or less, and more preferably 65 or less in JIS-C hardness. If the center hardness of the core is less than 45, the core is so soft and the durability may be lowered, while if the center hardness of the core is more than 70, the core is so hard and the shot feeling may be worsened. The hardness difference of the core can be provided by properly selecting the heat molding conditions of the core or employing a multi-layered structure of the center and the intermediate layer. The center hardness of the core means a JIS-C hardness obtained by cutting a spherical core into halves and measuring at the central point of the cut surface using a JIS-C type spring hardness tester. The surface hardness means a hardness measured at a surface part of the spherical core using a JIS-C type spring hardness tester. In the case that the core has a multi-layered structure, the surface hardness of the core means the hardness measured at the surface of the outermost layer of the core.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

According to the present invention, it is possible to provide a golf ball which has a high spin rate on approach shots and a low spin rate on driver shots. The spin rate on approach shots is preferably 6,500 rpm or more, more preferably 6,550 rpm or more. If the spin rate on approach shots is 6,500 rpm or more, the golf ball stops quickly on the green on the approach shots. The upper limit of the spin rate on approach shots is not limited, but if the spin rate on approach shots is too high, the spin rate on driver shots may also become high. From this aspect, the spin rate on approach shots is preferably 8,000 rpm or less, more preferably 7,800 rpm or less. On the other hand, the spin rate on driver shots is preferably 2,600 rpm or less, more preferably 2,580 rpm or less. If the spin rate on driver shots is 2,600 rpm or less, since the spin rate becomes low, the golf ball traveling a great distance is obtained. In order to increase the flight distance on driver shots, the certain degree of the spin rate is necessary. Thus, the spin rate on driver shots is preferably 2,000 rpm or more, more preferably 2,100 rpm or more, even more preferably 2,200 rpm or more. The spin rates on approach shots and driver shots are determined by the method described later.

Examples

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]
(1) Spin Rate on Approach Shots

An approach wedge (SRIXON I-302, Shaft S available from SRI Sports Limited) was installed on a swing robot available from Golf Laboratories, Inc. Golf balls were hit at a head speed of 21 m/sec., and a sequence of photographs of the hit golf ball were taken for measuring the spin rate (rpm). The measurement was performed ten times for each golf ball, and the average value is regarded as the spin rate (rpm).

(2) Spin Rate on Driver Shots

A driver (XXIO, shaft S, Loft angle: 11° available from SRI Sports Limited) was installed on a swing robot available from Golf Laboratories, Inc. Golf balls were hit at a head speed of 50 m/sec., and a sequence of photographs of the hit golf ball were taken for measuring the spin rate (rpm). The measurement was performed ten times for each golf ball, and the average value is regarded as the spin rate (rpm).

(3) Slab Hardness (Shore D Hardness)

Sheets having a thickness of about 2 mm were prepared from, polyurethane, or the golf ball material by hot press molding and preserved at the temperature of 23° C. for two weeks. Three or more of the sheets were stacked on one another to avoid being affected by the measuring substrate on which the sheets were placed, and the stack was subjected to the measurement using a P1 type auto hardness tester provided with the Shore D type spring hardness tester prescribed by ASTM-D2240, available from KOUBUNSHI KEIKI CO., LTD to obtain the respective slab hardness of the polyurethane or the golf ball material.

(4) Bending Stiffness (kgf/cm$^2$)

A sheet with a thickness of about 2 mm was produced by hot press molding the golf ball material, and stored at 23° C. for two weeks. The bending stiffness of this sheet was measured according to JIS K7106.

(5) Core Hardness (JIS-C)

The hardness measured at a surface part of a spherical core using a P1 type auto hardness tester provided with a JIS-C type spring hardness tester available from KOUBUNSHI KEIKI CO., LTD, was determined as the surface hardness of the spherical core, and the JIS-C hardness obtained by cutting a spherical core into halves and measuring at the central point of the cut surface was determined as the center hardness of the spherical core.

[Production of the Golf Ball]
(1) Preparation of the Center

The center rubber composition having formulation shown in Table 1 was kneaded and pressed in upper and lower molds, each having a hemispherical cavity, at a temperature of 170° C. for 15 minutes to obtain the spherical center having a diameter ranging from 35.5 mm to 38.9 mm.

TABLE 1

| Center composition | Parts |
|---|---|
| Polybutadiene rubber | 100 |
| Zinc acrylate | 35 |
| Zinc oxide | 5 |
| Diphenyl disulfide | 0.5 |
| Dicumyl peroxide | 1 |

Notes on table 1:
Formulation: Parts by mass
Polybutadiene rubber: "BR730 (high cis-polybutadiene)" manufactured by JSR Corporation
Zinc acrylate: "ZNDA-90S" manufactured by NIHON JYORYU KOGYO Co,. LTD.
Zinc oxide: "Ginrei R" manufactured by Toho-Zinc Co.
Dicumyl peroxide: "Percumyl D" manufactured by NOF Corporation
Diphenyl disulfide: manufactured by Sumitomo Seika Chemicals Company Limited (2) Preparation of Core The blending materials shown in Table 2 were extruded by a twin-screw kneading extruder to prepare an intermediate layer composition in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. The obtained intermediate layer composition was injection molded on the center which had been obtained as described above, to prepare a core consisting of the center and the intermediate layer (thickness: 1.6 mm) covering the center.

TABLE 2

| Core No. | | 1 | 2 | 3 | 4 | 5 |
|---|---|---|---|---|---|---|
| Center diameter (mm) | | 38.5 | 38.9 | 37.5 | 36.5 | 35.5 |
| Inter- | Himilan 1605 | 50 | 50 | 50 | 50 | 50 |
| mediate | Himilan AM7329 | 50 | 50 | 50 | 50 | 50 |
| layer | Slab hardness (Shore D) | 64 | 64 | 64 | 64 | 64 |
| | Thickness (mm) | 1.6 | 1.6 | 1.6 | 1.6 | 1.6 |
| Core | Diameter (mm) | 41.7 | 42.1 | 40.7 | 39.7 | 38.7 |
| Prop- | Surface hardness (JIS-C) | 98 | 98 | 98 | 98 | 98 |
| erty | Center hardness (JIS-C) | 65 | 65 | 65 | 65 | 65 |
| | Hardness difference (JIS-C) | 33 | 33 | 33 | 33 | 33 |
| | Compression deformation amount (mm) | 2.55 | 2.55 | 2.55 | 2.52 | 2.5 |

Notes on table 2:
Formulation: parts by mass
Himilan 1605: sodium ion neutralized ethylene-methacrylic acid copolymerized ionomer resin manufactured by MITSUI-DUPONT POLYCHEMICAL CO., LTD. Himilan AM7329: zinc ion neutralized ethylene-methacrylic acid copolymerized ionomer resin manufactured by MITSUI-DUPONT POLYCHEMICAL CO., LTD.

(3) Preparation of Cover Composition.

As the blending ratios shown in tables No. 3 to 5, the polyurethane and the flake-like filler were blended to prepare the cover composition in the form of the pellet. The polyurethane was kneaded for 2 minutes using a dispersion mixing tester MIX-LABO manufactured by MORIYMA Company Ltd. Then, the flake like filler was added and the mixture was kneaded for 3 minutes. Blending was carried out at a temperature of 180° C. and at a revolution of 100 rpm.

(4) Molding of Half Shells

Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

(5) Molding of the Cover

The core obtained in (2) was covered with the two half shells obtained in (4) in a concentric manner, and the cover (thickness: 0.5 mm) was molded by compression molding. Compression molding was performed at a temperature of 145° C. for 2 minutes under a molding pressure of 9.8 MPa. The surface of the obtained golf ball body was subjected to a sandblast treatment, and marking, and then clear paint was applied thereto and dried in an oven at a temperature of 40° C. to obtain a golf ball having a diameter of 42.7 mm and a weight of 45.3 g. The performance of the obtained golf ball was evaluated, and results thereof are also shown in Tables 3 to 5.

TABLE 3

| Golf ball No. | | 1 | 2 | 3 | 4 | 5 | 6 | 7 | 8 | 9 |
|---|---|---|---|---|---|---|---|---|---|---|
| Core No. | | 1 | 1 | 1 | 1 | 1 | 1 | 1 | 1 | 1 |
| Cover | Elastollan XNY-68A | — | — | — | — | — | — | — | — | — |
| compo- | Elastollan XNY-70A | — | — | — | — | — | — | — | — | — |
| sition | Elastollan XNY-75A | — | — | — | — | 100 | — | — | — | — |
| | Elastollan XNY-83A | 100 | — | — | — | — | 100 | — | — | — |
| | Elastollan XNY-85A | — | 100 | — | — | — | — | 100 | — | — |
| | Elastollan XNY-90A | — | — | 100 | — | — | — | — | 100 | — |
| | Elastollan XNY-97A | — | — | — | 100 | — | — | — | — | 100 |
| | Flake-like filler | 0 | 0 | 0 | 0 | 10 | 10 | 10 | 10 | 10 |
| | Titanium oxide | 4 | 4 | 4 | 4 | 4 | 4 | 4 | 4 | 4 |
| | Slab hardness (Shore D) | 31 | 38 | 41 | 49 | 33 | 38 | 44 | 47 | 51 |
| | Bending stiffness (kgf/cm$^2$) | 75 | 119 | 166 | 442 | 55 | 200 | 269 | 470 | 975 |
| | Shore D/log(bending stiffness, kgf/cm$^2$) | 16.5 | 18.3 | 18.5 | 18.5 | 19.0 | 16.5 | 18.1 | 17.6 | 17.1 |
| Cover thickness (mm) | | 0.5 | 0.5 | 0.5 | 0.5 | 0.5 | 0.5 | 0.5 | 0.5 | 0.5 |
| Ball | Spin rate on Approach shots (rpm) | 6908 | 6650 | 6465 | 6335 | 6945 | 6578 | 6470 | 6487 | 6078 |
| | Spin rate on Driver shots (rpm) | 2649 | 2482 | 2370 | 2254 | 2556 | 2460 | 2342 | 2326 | 2172 |

Formulation: parts by mass

TABLE 4

| Golf ball No. | | 10 | 11 | 12 | 13 | 14 | 15 | 16 | 17 | 18 | 19 | 20 |
|---|---|---|---|---|---|---|---|---|---|---|---|---|
| Core No. | | 1 | 1 | 1 | 1 | 1 | 1 | 1 | 2 | 3 | 4 | 5 |
| Cover | Elastollan XNY-68A | — | — | — | — | — | — | 100 | 100 | 100 | 100 | 100 |
| compo- | Elastollan XNY-70A | 100 | — | — | — | — | — | — | — | — | — | — |
| sition | Elastollan XNY-75A | — | 100 | — | — | — | — | — | — | — | — | — |

TABLE 4-continued

| Golf ball No. | | 10 | 11 | 12 | 13 | 14 | 15 | 16 | 17 | 18 | 19 | 20 |
|---|---|---|---|---|---|---|---|---|---|---|---|---|
| | Elastollan XNY-83A | — | — | 100 | — | — | — | — | — | — | — | — |
| | Elastollan XNY-85A | — | — | — | 100 | — | — | — | — | — | — | — |
| | Elastollan XNY-90A | — | — | — | — | 100 | — | — | — | — | — | — |
| | Elastollan XNY-97A | — | — | — | — | — | 100 | — | — | — | — | — |
| | Flake-like filler | 20 | 20 | 20 | 20 | 20 | 20 | 40 | 40 | 40 | 40 | 40 |
| | Titanium oxide | 4 | 4 | 4 | 4 | 4 | 4 | 4 | 4 | 4 | 4 | 4 |
| | Slab hardness (Shore D) | 34 | 39 | 43 | 45 | 47 | 52 | 32 | 32 | 32 | 32 | 32 |
| | Bending stiffness (kgf/cm$^2$) | 50 | 102 | 490 | 634 | 908 | 1401 | 18 | 18 | 18 | 18 | 18 |
| | Shore D/log(bending stiffness, kgf/cm$^2$) | 20.1 | 19.4 | 16.0 | 16.1 | 15.9 | 16.5 | 25.4 | 25.4 | 25.4 | 25.4 | 25.4 |
| Cover | thickness (mm) | 0.5 | 0.5 | 0.5 | 0.5 | 0.5 | 0.5 | 0.5 | 0.3 | 1.0 | 1.5 | 2.0 |
| Ball | Spin rate on Approach shots (rpm) | 7039 | 6738 | 6502 | 6370 | 6319 | 5742 | 6953 | 6740 | 7095 | 7199 | 7269 |
| | Spin rate on Driver shots (rpm) | 2492 | 2400 | 2360 | 2359 | 2261 | 2217 | 2430 | 2322 | 2500 | 2562 | 2600 |

Formulation: parts by mass

TABLE 5

| Golf ball No. | | 21 | 22 | 23 | 24 | 25 |
|---|---|---|---|---|---|---|
| Core No. | | 1 | 1 | 1 | 1 | 1 |
| Cover compo-sition | Elastollan XNY-68A | — | — | — | — | — |
| | Elastollan XNY-70A | 100 | — | — | — | — |
| | Elastollan XNY-75A | — | — | — | — | — |
| | Elastollan XNY-83A | — | 100 | — | — | — |
| | Elastollan XNY-85A | — | — | 100 | — | — |
| | Elastollan XNY-90A | — | — | — | 100 | — |
| | Elastollan XNY-97A | — | — | — | — | 100 |
| | Flake-like filler | 40 | 40 | 40 | 40 | 40 |
| | Titanium oxide | 4 | 4 | 4 | 4 | 4 |
| | Slab hardness (Shore D) | 37 | 44 | 49 | 52 | 55 |
| | Bending stiffness (kgf/cm$^2$) | 50 | 1103 | 1267 | 1694 | 2389 |
| | Shore D/log(bending stiffness, kgf/cm$^2$) | 21.8 | 14.5 | 15.8 | 16.1 | 16.3 |
| Cover thickness (mm) | | 0.5 | 0.5 | 0.5 | 0.5 | 0.5 |
| Ball | Spin rate on Approach shots (rpm) | 6762 | 6273 | 5968 | 5836 | 5822 |
| | Spin rate on Driver shots (rpm) | 2375 | 2382 | 2265 | 2276 | 2318 |

Formulation: parts by mass

Figure 3:
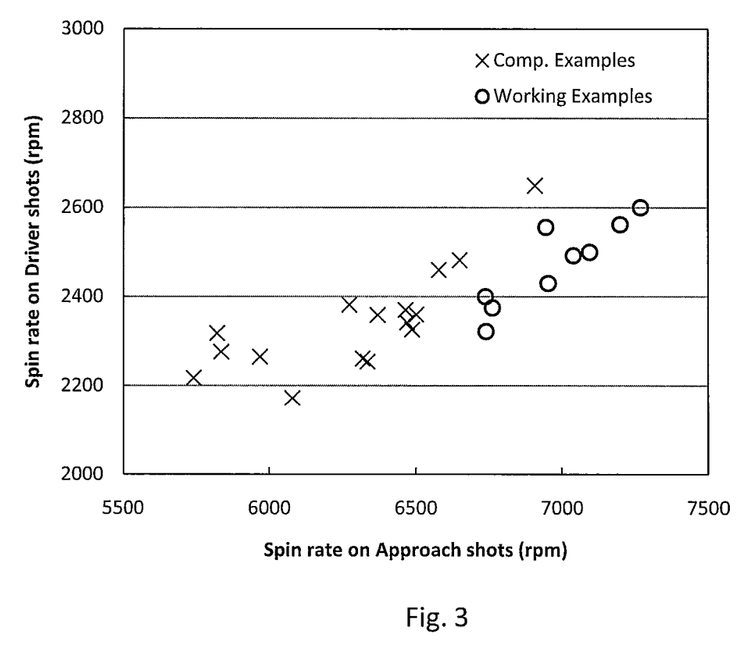
FIG. 3 is a graph showing a correlation between the spin rate on approach shots and the spin rate on driver shots.

Elastollan XNY-68A: thermoplastic polyurethane elastomer having Shore D hardness of 22 available from BASF Japan Co.
Elastollan XNY-70A: thermoplastic polyurethane elastomer having Shore D hardness of 24 available from BASF Japan Co.
Elastollan XNY-75A: thermoplastic polyurethane elastomer having Shore D hardness of 28 available from BASF Japan Co.
Elastollan XNY-83A: thermoplastic polyurethane elastomer having Shore D hardness of 31 available from BASF Japan Co.
Elastollan XNY-85A: thermoplastic polyurethane elastomer having Shore D hardness of 38 available from BASF Japan Co.
Elastollan XNY-90A: thermoplastic polyurethane elastomer having Shore D hardness of 41 available from BASF Japan Co.
Elastollan XNY-97A: thermoplastic polyurethane elastomer having Shore D hardness of 49 available from BASF Japan Co.
Flake like filler: S-BEN NO12 (organically modified montmorillonite) available from HOJUN Co., Ltd Golf balls No. 5, No. 10, N. 11, No. 16 to No. 21 are the cases that the golf ball cover is formed from the golf ball material having a ratio [Shore D/log(bending stiffness)] of Shore D hardness to a logarithm of bending stiffness (kgf/cm$^2$) of 19.0 or more. Each golf ball produced a low spin rate on driver shots while produced a high spin rate on approach shots. For example, if the golf balls No. 1 and golf ball No. 5 or golf ball No. 10 are compared, the spin rates on driver shots of golf balls No. 5 and No. 10 are lower than that of golf ball No. 1, although the spin rates on approach shots are not nearly unchanged. FIG. 3 is a graph showing a correlation between the spin rate on approach shots and the spin rate on driver shots for the working examples and comparative examples of the present invention. This graph indicates that the golf balls of the working examples of the present invention produced a high spin rate on approach shots and a low spin rate on driver shots.

According to the present invention, it is possible to provide a golf ball having a high spin rate on approach shots and a low spin rate on driver shots. This application is based on Japanese Patent application No. 2009-298111 filed on Dec. 28, 2009, the contents of which are hereby incorporated by reference.

What is claimed is:

1. A golf ball material having a ratio [Shore D/log(bending stiffness)] of Shore D hardness to a logarithm of bending stiffness (kgf/cm$^2$) of 19.0 or more and a bending stiffness of 300 kgf/cm$^2$ or less, and comprising a thermoplastic elastomer as a resin component and a flake-like or needle-like filler as a filler, in an amount ranging from 10 parts to 100 parts by mass based on 100 parts by mass of the resin component.

2. The golf ball material according to claim 1, having a Shore D hardness of 15 D or more.

3. The golf ball material according to claim 1, wherein the filler includes a layered silicate or an organically modified layered silicate.

4. The golf ball material according to claim 3, wherein each layer constituting the layered silicate has a thickness of 10 nm or less when the filler includes layered silicate or each layer constituting the organically modified layered silicate has a thickness of 10 nm or less when the filler includes organically modified layered silicate.

5. The golf ball material according to claim 3, wherein each layer constituting the layered silicate has a flat shape with a length of 1 μm or less and a width of 1 μm or less when the filler includes layered silicate or each layer constituting the organically modified layered silicate has a flat shape with a length of 1 μm or less and a width of 1 μm or less when the filler includes organically modified layered silicate.

6. The golf ball material according to claim 3, wherein the filler includes layered silicate, and
wherein the layered silicate has a cation exchange capacity ranging from 30 meq/100 g to 200 meq/100 g.

7. The golf ball material according to claim 3, wherein the filler includes organically modified layered silicate, and
wherein the organically modified layered silicate has an ion exchange rate of 50 mole % or more.

8. The golf ball material according to claim 1, wherein the thermoplastic elastomer includes a thermoplastic polyurethane elastomer.

9. The golf ball material according to claim 8, wherein a polyol component constituting the thermoplastic polyurethane elastomer includes polytetramethylene ether glycol.

10. The golf ball material according to claim 8, wherein the polyisocyanate component constituting the thermoplastic polyurethane elastomer includes dicyclohexylmethane diisocyanate.

11. The golf ball material according to claim 8, wherein the chain extender component constituting the thermoplastic polyurethane elastomer includes butane diol.

12. A golf ball comprising a core and a cover covering the core, wherein the cover is formed from a golf ball material having a ratio [Shore D/log(bending stiffness)] of Shore D hardness to a logarithm of bending stiffness (kgf/cm$^2$) of 19.0 or more and a bending stiffness of 300 kgf/cm$^2$ or less, and comprising a thermoplastic elastomer as a resin component and a flake-like or needle-like filler as a filler, in an amount ranging from 10 parts to 100 parts by mass based on 100 parts by mass of the resin component.

13. The golf ball according to claim 12, wherein the golf ball has a multi-layered core having a center and at least one intermediate layer covering the center.

14. The golf ball according to claim 13, wherein the intermediate layer has a thickness ranging from 0.3 mm to 6.0 mm and a slab hardness ranging from 40 to 80 in Shore D hardness.

15. The golf ball according to claim 12, wherein the core has a surface hardness ranging from 65 to 100 and a center hardness ranging from 45 to 70 in JIS-C hardness and a hardness difference ranging from 10 to 40 in JIS-C hardness between the surface hardness and the center hardness thereof.

16. The golf ball according to claim 12, wherein the cover has a thickness ranging from 0.3 mm to 2.0 mm.

17. The golf ball according to claim 12, wherein the golf ball material comprises a thermoplastic polyurethane elastomer as a resin component and a layered silicate or an organically modified layered silicate as a filler.

* * * * *